United States Patent [19]

Alexander et al.

[11] 4,154,473
[45] May 15, 1979

[54] VEHICLE ROOF STRUCTURE KIT

[75] Inventors: Michael T. Alexander, Grosse Isle; Dennis F. Welch, Troy, both of Mich.

[73] Assignee: American Sunroof Corporation, Southgate, Mich.

[21] Appl. No.: 792,786

[22] Filed: May 2, 1977

[51] Int. Cl.² ............................................. B62D 25/06
[52] U.S. Cl. .................................................. 296/137 R
[58] Field of Search .......................... 280/152 R, 153; 296/1 R, 31 P, 137 R

[56] References Cited
U.S. PATENT DOCUMENTS

| 3,338,617 | 8/1967 | Lockwood | 280/153 X |
| 3,815,307 | 6/1974 | Tantlinger | 296/137 R X |
| 3,926,471 | 12/1975 | Nadasi et al. | 296/137 R |

Primary Examiner—Joseph F. Peters, Jr.
Assistant Examiner—Norman L. Stack, Jr.
Attorney, Agent, or Firm—Basile and Weintraub

[57] ABSTRACT

The contour of the roof of a vehicle is modified by the securement thereto of a pre-formed cap or shroud. The shroud has a decorative overlay to enhance the aesthetics of the modification. The overlay or cap has an interior contour which, when disposed atop the roof structure of the vehicle, modified the contour thereof. The present invention further contemplates suitable moldings or the like for securely attaching the overlay to the vehicle.

9 Claims, 4 Drawing Figures

VEHICLE ROOF STRUCTURE KIT

BACKGROUND OF THE INVENTION

1. Field of the Invention

The present invention pertains to automotive vehicles and, in particular, the roof structure thereof. More particularly, the present invention pertains to means and methods for modifying or "customizing" the contours of an automotive vehicle roof. Even more particularly, the present invention pertains to kits which comprise pre-formed structure for utilization in modifying or customizing an automotive vehicle roof structure.

2. Prior Art

As is known to those skilled in the art to which the present invention pertains, the present day market for automotive vehicle places a great deal of emphasis on both the interior and exterior appointments of the vehicle. The appointments not only enhance the aesthetic appeal of the vehicle, but, also, greatly enhances and maintains the value of such vehicle. To this end, one of the more common appointments associated with a vehicle is a "vinyl roof." Generally, such vinyl roofs are provided by merely securing to the roof structure a pre-formed sheet of vinyl in a preselected color. Suitable moldings, as well as adhesives are utilized to maintain the vinyl sheet in adhesion with the metallic roof structure. However, it is to be appreciated that the mere securement of a pre-formed vinyl sheet to a roof does not alter the contours of the roof. Thus, there is no "customizing" of the roof structure but, rather, merely a decorative surface is applied thereto.

Also, and as is known to the skilled artisan, alteration of roof structure of a vehicle is oftentimes requested by the discriminating vehicle purchaser. Such roof contour or outline modification, while being highly desirable and appealing, is a difficult and cumbersome task according to presently known technology. Within the context of present known technology, such modification occurs solely by the rupturing or severing of the roof, as originally constructed, from the remainder of the vehicle body. In other words, the initially constructed vehicle has its roof or a portion thereof removed from the vehicle and the desired modifications thereafter rendered. In essence, the roof structure of the vehicle is rebuilt according to the desires of the owner or by the dictates of the marketplace. The costs in both labor and construction renders such operations extremely expensive and difficult.

Therefore, it is to be readily appreciated, that a major advance in the art of "customizing" vehicles would be provided by the device of means and methods for modifying the roof structure of a vehicle without the heretofore necessary cutting of the roof, per se. It is this to which the present invention is directed.

SUMMARY OF THE INVENTION

In accordance with the present invention, there is provided a pre-formed structure for modifying the contours of the roof of a vehicle and, in particular, an automotive vehicle. The pre-formed structure hereof generally comprises a fiberglass cap, which is molded into a pre-determined shape. An aesthetic overlay, such as a vinyl covering, is adhered or otherwise secured to the fiberglass cap or shroud.

The cap generally comprises a planar top wall, a pair of downwardly depending, opposed, spaced apart side walls and a sloping side wall or rear window engaging wall. The cap is formed as an integrally molded unit. The cap or shroud is dimensioned to be tangentially engaged with the roof sections which it overlays.

The present invention further contemplates means for securing the cap to the vehicle.

Furthermore, and in accordance with the present invention, the roof contour of the vehicle is modified, without severance of any of the roof structure, by mounting thereonto the cap thereby and, thereafter, securing the cap to the roof through the utilization of the means referred to above.

The structure hereof utilized to modify the roof contour can be packaged into a kit for ready assembly.

For a more complete understanding of the present invention, reference is made to the following detailed description and accompanying drawing. In the drawing, like reference characters refer to like parts throughout the several views in which:

DESCRIPTION OF THE PREFERRED EMBODIMENT

Figure 1:
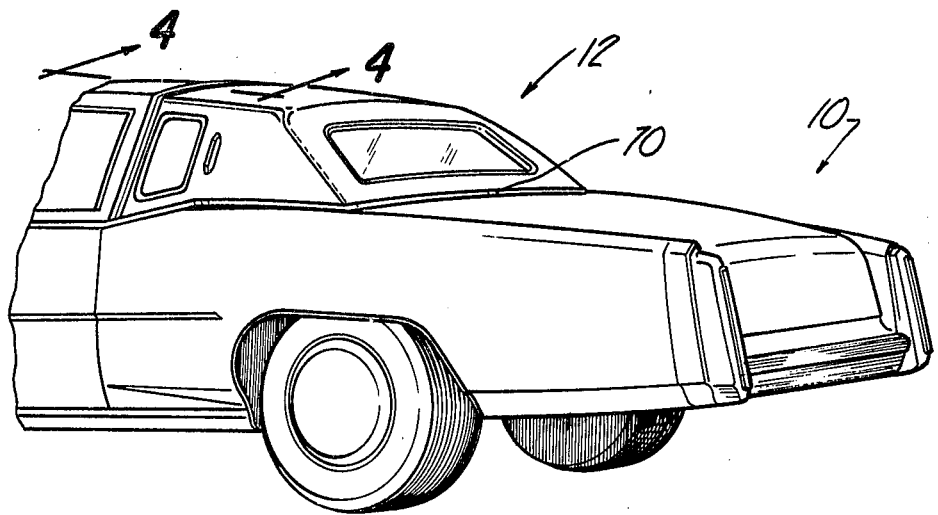
FIG. 1 is a broken, perspective view of a automotive vehicle having the roof modification structure of the present invention secured thereof.

Now, and with reference to the drawing, there is depicted therein the rear portion of a vehicle, generally denoted at 10 which has mounted thereonto a roof structure assembly generally denoted at 12 and in accordance with the present invention. As heretofore noted, the assembly 12 hereof alters the normal contour of the roof without the necessity for cutting same.

As shown in the drawing, the assembly 12 comprises a cowl or cap 14 which is a pre-formed structure which is adapted to engage the roof structure of the vehicle. The cap 14, as noted, is pre-formed in a preselected style which alters the contour of the roof of the vehicle. The cap 14 generally comprises a roof or top portion 16, a pair of opposed, lateral downwardly depending side panels 18, 20, respectively, and a rear or sloping panel 22. The cap is formed as a unitary structure. The rear panel 22 is adapted to engage the rear window deck or section of the roof of the vehicle. The lateral side walls are adapted to engage and cover the rear window section of the roof of the vehicle.

The cap 14 is, preferably, formed from fiberglass. Alternatively, the cap can be formed from other synthetic resinous materials, such as an ABS resin or the like. Where such ABS resins are utilized, normally, ribs are integrally molded therewith and which are disposed in the void 26 and abut the roof to impart structural integrity to the cap assembly 12, per se.

The assembly 12 further comprises a padding 19 which is adhered to the cap 14 by any suitable mode, such as an adhesive or the like. The padding can be formed from any suitable flexible synthetic resinous material, such as a polyurethane foam or the like. Adhered to the pad 18 is an aesthetic cover 21. The cover 21 provides the necessary decorative finish to the assembly to enhance the aesthetics of the vehicle. The cover 21 is, preferably, formed from a polyvinyl. The polyvinyl is adhered to the pad by any suitable mode.

In fabricating the structure or assembly 12, the side wall 18 has a first opening 24 which is coincident with and overlies the ordinary or pre-existing side window of the vehicle. Specifically, the opening 24 is adapted to be coincident with an opera window formed in the roof structure of the vehicle. However, the opening 24 may or may not be of the same configuration as the window, as desired. A similar opening (not shown) is formed in the opposed wall 20. The pad 19, as well as the vinyl cover 21 also have openings formed therein which register with and are coincident with the opening 24 formed in the cap 14.

Figure 3:
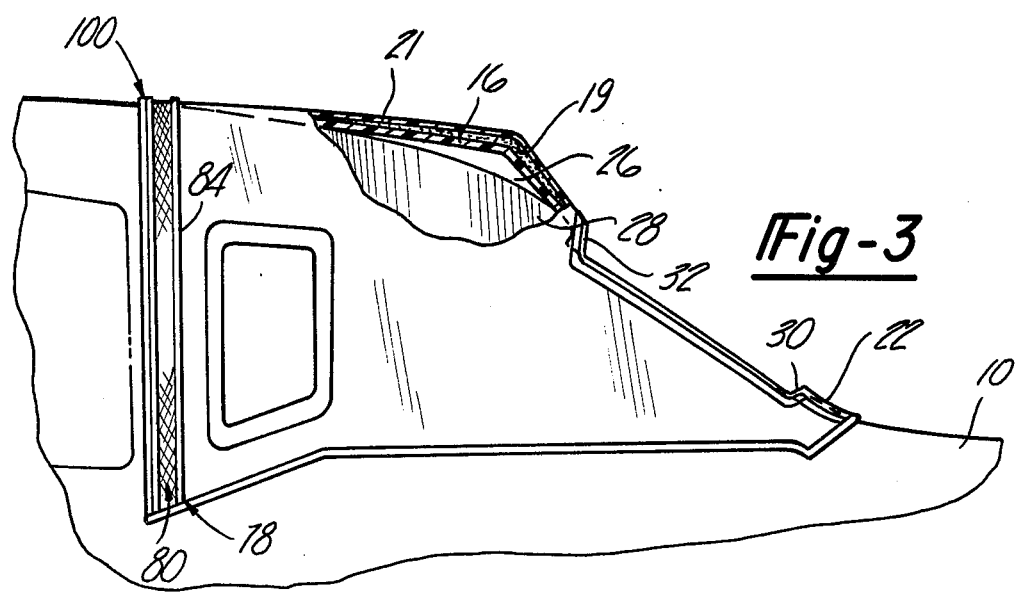
FIG. 3 is a broken, partly cut away, first side view of a vehicle having the roof modification structure mounted thereonto.

Referring, specifically to FIG. 3, and as heretofore noted, the present invention comprises an alteration or modification of the roof line structure of the vehicle onto which the present invention is mounted. Thus, and in accordance herewith, it is to be noted that the cap 14 has its top wall contiguous to only a portion of the roof of the vehicle. Thus, as the cap extends rearwardly of the vehicle, there is a void 26 which is created between the cap and the roof 28 of the vehicle. The void has its greatest diameter at the junction of the top wall and the downwardly depending, sloped rear wall 22 of the cap 14. Thus, it is to be readily perceived that the structure of the assembly 12 alters the roof line contour of the vehicle without the necessity of cutting or otherwise disrupting the structural integrity of the vehicle.

Still referring to FIG. 3, it is to be further noted that the assembly 12 hereof also modifies the outline of the rear window of the vehicle, if desired. The wall structure 22 has an opening 30 which is circumjacent the rear window of the vehicle and which circumscribes the window. The opening 30 is defined by a recess formed within the assembly 12. The wall 22 is constructed to provide an inwardly directed circumferential wall 32 which circumscribes the rear window of the vehicle. The wall 32 is sloped and inwardly directed, as shown. Because the assembly 12 is substantially contiguous to the roof structure of the vehicle, the inclined slope 32 of the wall 22 subscribes an outline which is different than that of the normal outline of the rear window of the vehicle, as shown. Thus, the rear window portion of the roof structure is altered in accordance herewith. It is to be noted in this regard that the pad 19, as well as the cover 21 remains substantially contiguous to the cap 14 throughout the entire construction.

It should be noted that with respect hereto, the wall 32 need not modify or alter the outline of the window. Rather, the wall 22 can simply overlie the rear window section of the vehicle roof and a decorative molding or the like can circumscribe the rear window area.

Referring again to FIG. 2, in order to secure the cap in position, the interior of the vehicle is somewhat modified. To this end, there is mounted within the interior of the vehicle panel assemblies 34, 36, respectively, which are coincident with the left and right sides of the vehicle and are adapted to cooperate with side walls 18, 20 of the cap structure. The assemblies 34, 36 are each analogously constructed and comprise planar members 38 having openings 40 formed therein which register with the openings 24 of the assembly 12. The openings carry a peripheral flange 42 which matingly engages the periphery about the vehicle side window and is secured thereto through any suitable means such as pop rivets or the like. The panel 38 is formed with a peripheral flange 44, which extends therearound and which is secured to the interior of the vehicle, again, through any suitable mode such as rivets or the like. The interiorly exposed surface of each of the panels 34 or 36 is provided with a decorative overlay which matches the interior decoration of the vehicle or is coordinated therewith.

Also, disposed within the interior of the vehicle is a rear panel assembly 48, which is a substantially planar member having a central opening 50 formed therethrough and which is disposed within the interior of the vehicle. The panel member 48, per se, is adapted to register with the rear side wall 22 of the exterior cap 14 to complete both the interior and exterior modification. The panel 14 has a plurality of apertures 52 formed therearound and therethrough. Suitable fastening means, such as screws 54 are utilized to fasten the panel member 48 to the interior rear window section of the vehicle. A decorative cover or the like can be secured to the panel by any well known means such as an adhesive or the like in order to complete the aesthetic interior decoration of the vehicle.

As heretofore noted, the present invention further includes means for mounting the assembly 12 to the vehicle. The means generally comprises a molding assembly, generally denoted at 56 for securely mounting the assembly 12 to the vehicle at the junction of the roof and body portions of the vehicle, as well as means, generally denoted at 58, which securely mounts the assembly 12 to the roof, per se, of the vehicle 10.

The means 56 generally comprises a pair of similarly constructed right angle moldings 60, 62 which extend from the forward portion of the cap, at the base thereof and around the rear wall section 22 thereof. Each molding comprises a plurality of inwardly directed fasteners 64, 66. The fasteners 64, 66 project through apertures 68 formed in the cap assembly 12. The apertures 68 are defined by apertures formed in a cap, the padding and the vinyl covering which are in registry with one another upon the assemblage of the structure 12. The fasteners 64 or 66 project through these apertures. The fasteners 64, 66 have a diameter slightly greater than that of the aperture 68 and they are utilized to frictionally be retained therewithin. The moldings are decorative in nature and are utilized to provide a finished look to the vehicle or to retain the cap assembly 12 firmly in position. Also, an adhesive can be utilized to effectuate an adhesion between the molding and the body of the vehicle, as well as with the cap. Also, the two molding assemblies are interconnected via a coupling 70 which includes an inwardly directed or projecting stud 72 which penetrates the cap assembly 12. A nut or the like can be secured to the stud for rendering fast the coupling 70.

Also, it should be noted in this regard that disposed interiorly of the vehicle and associated with panel member 48 are a plurality of support members 74 which are utilized to mount and support the panel to the interior rear window roof structure of the vehicle. Fastening means, such as screws 76 or the like, can be utilized to mount the support member 74 to the interior rear window wall structure of the vehicle.

The means 58 provides both a decorative, as well as, functional assembly for securing the cap assembly to the roof of the vehicle. The means 58, as clearly depicted in FIGS. 2 and 5 hereof, generally comprises a molding 78 and a decorative insert therefor, generally denoted at 80.

More specifically, the molding 78 comprises a U-shaped member 81 having a central recess or keyway 82 formed therewith. The member 81 comprises first and second legs 84, 86 and interconnecting bight member 88 integrally formed therewith. The legs 84 and 86 engage the sides of the roof and the bight portion traverses the width of the roof. Within the recess is seated the insert 80. Furthermore, a plurality of apertures 90 are formed in the recess along the extent of the molding. These apertures are utilized for deployment of fastening means, generally, denoted at 92.

The insert 80 generally comprises a stiffening plate 94 which has a width substantially equal to the width of the recess 82. A foam, such as a polyurethane foam 96, which is flexible in nature, is adhered to the plate 94 by any suitable mode including adhesives or the like. A decorative overlay or vinyl covering 98 is then utilized to wrap the plate 94 and the foam 96. The cover imparts a decorative appearance to the insert. The vinyl covering is the same as that utilized for the cover 20.

Alternatively, other types of inserts, such as an integrally formed stud and decorative covering insert, as well as other inserts can be utilized with equal efficacy in the practice of the present invention.

As heretofore noted, a plurality of apertures 90 are formed along the extent of the channel or recess 82. Projecting through the apertures and through registering apertures formed in the assembly 12 and pop rivets or the like defining the fastening means 92. These rivets or pins are utilized to secure the molding to the roof of the vehicle and to emplace the assembly 12 firmly in position. The fastening means 92 are interposed between the molding and the insert member. The insert member is retained in position through an adhesive or other suitable means.

Figure 2:
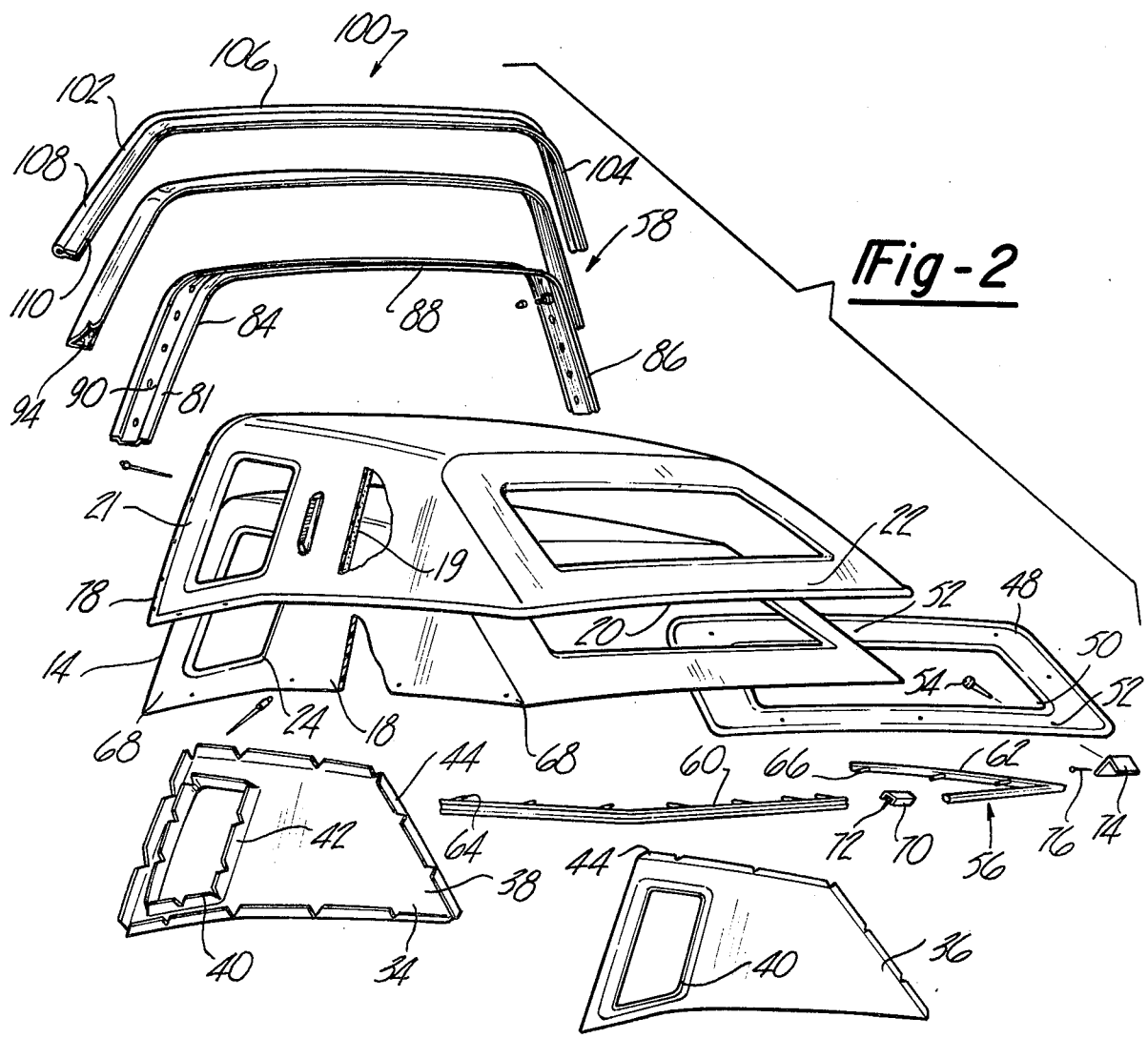
FIG. 2 is an exploded perspective view of the fiberglass cap, vinyl overlay, interior mountings, as well as the means for securing the cap which comprise the kit of the present invention.
Figure 4:
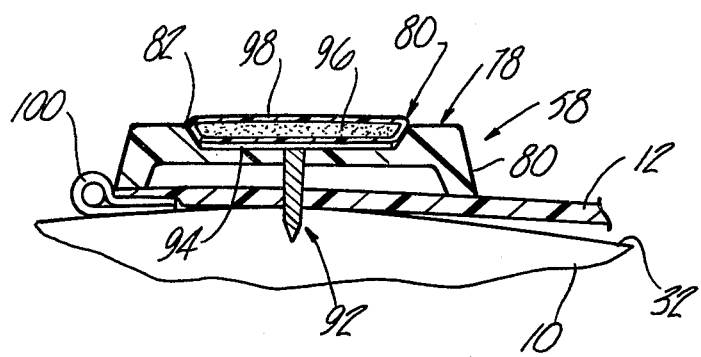
FIG. 4 is a cross-sectional view taken along the line 4—4 of FIG. 1.

Referring, specifically, to FIGS. 2 and 4, it will be noted that the present invention further comprises a welt cord assembly for further aesthetic appeal being imparted to the vehicle. The assembly 100 comprises first and second legs 102, 104 and bight portion 106 which interconnects the legs to form an integral unit. The assembly comprises a bead section 108 and a projecting flange 110 integrally formed with the bead. The bead 108 imparts decorative appeal and the flange or arm 110 offers means for securely mounting the welt cord assembly onto the roof structure. The flange or arm is compressible and fits beneath the terminus or free edge of the assembly 12, as shown. The welt cord assembly can be formed as an integral unit from a single piece of stock which is then bent over in the shape of the bead with the projecting arms or flange.

Again, in mounting the welt cord assembly, it is wedged underneath the free or terminal edge of the cap and retained therewithin.

In deploying the present invention, the assembly 12 is fitted onto the roof structure to alter the contours thereof. The exterior trim is then installed and caulked and sealed and adhered to the exterior of the roof surface, as well as being mounted onto the mounting means. Thereafter, the moldings are placed in position with the welt cord assembly being wedged underneath the edge molding. In this manner, the entire roof contour of the vehicle can be altered with the complementary necessary changes in the interior being effectuated in order to provide a roof modification without the necessity for cutting or otherwise severing the roof. Furthermore, it is to be appreciated that in accordance herewith, the assembly 12 can be molded as an integral unit and thereafter packaged in a kit along with the moldings and the interior panels. Such kit packaging enables "on site" installation without the necessity for making such modifications on a production line at the automotive factory.

It will be apparent to those skilled in the art to which the invention pertains that many modifications can be made in the present invention. Such modifications are contemplated as being within the scope of the present invention without departing from the spirit and scope hereof.

The embodiments of the invention in which an exclusive privilege or property is claimed are defined as follows:

1. In combination with an automotive vehicle, a pre-packaged assembly for cosmetically altering the contour of the roof of the vehicle without the severing of same, comprising:
   (a) an assembly circumscribing at least a portion of the roof of the vehicle, the assembly having a different contour than that of the roof of the vehicle, the assembly comprising:
      (1) a pre-formed cap comprising a top wall, a pair of opposed, downwardly depending side walls integral with the top wall, a rear wall depending from the top wall and integral with the top wall and side walls, the side walls being engageable with the side wall of the roof of the vehicle, and wherein, a portion of the top wall is in contact with only a coincident portion of the top of the vehicle roof the vehicle roof having a first convex surface, the top wall of the cap having a second convex surface which is of greater convexity than the first surface such that between the contact areas a space is created to alter the roof contour of the vehicle,
      (2) a padding overlying and being coincident with the cap, and
      (3) a decorative covering secured to the padding, and
   (b) means for securing the assembly to the roof, and wherein the contour of the roof is altered without bonding the assembly thereto.

2. The combination of claim 1 wherein the securing means comprises:
   a U-shaped molding having integrally formed opposed legs which engage the side walls of the asembly and a bight portion which traverses the roof of the vehicle and engages the top portion of the assembly, and
   fastening means extending through the molding and the assembly and into the roof of the vehicle.

3. The combination of claim 2 wherein:
   (a) the molding has a central channel formed along the extent thereof and a plurality of apertures formed in the channel, the fastening means extending through the apertures, and
   (b) the securing means further comprises a decorative insert which is disposed in the channel.

4. The combination of claim 1 wherein:
   (a) the cap is a fiberglass cap,
   (b) the padding is a flexible polyurethane padding, and
   (c) the cover is a vinyl cover.

5. The combination of claim 2 which further comprises:
   a welt cord assembly having a portion wedged beneath the free edge of the top wall.

6. A pre-packaged assembly for cosmetically altering the roof contour of an automatic vehicle, comprising:
   (a) an assembly for circumscribing at least a portion of the roof, the assembly having a different contour than that of the roof and comprising:
      (1) a pre-formed cap comprising a top wall, a pair of opposed, downwardly depending side walls integral with the top wall, a rear wall depending from the top wall and integral with the top wall and side walls, the side walls being engageable with the side walls of the roof of the roof of the vehicle,
      (2) a padding overlying and being coincident with the cap,
      (3) a decorative covering secured to the padding,
   (b) means for securing the assembly to the roof, and wherein a portion of the top wall of the cap is in contact with only a coincident portion of the vehicle roof, the roof of the vehicle having a first convex surface, the top wall of the cap having a second convex surface which is of greater convexity than the first surface such that between the contact areas a space is created to alter the roof contour thereof absent the need for severing the roof of the vehicle.

7. The assembly of claim 6 wherein the securing means comprises:
   a U-shaped molding having integrally formed opposed legs which engage the side walls of the assembly and a bight portion which traverses the roof of the vehicle and engages the top portion of the assembly, and
   fastening means extending through the molding and the assembly and into the roof of the vehicle.

8. The assembly of claim 7 wherein:
   (a) the molding has a central channel formed along the extent thereof and a plurality of apertures formed in the channel, the fastening means extending through the apertures, and
   (b) the securing means further comprises a decorative insert which is disposed in the channel.

9. The assembly of claim 8 wherein:
   (a) the cap is a fiberglass cap,
   (b) the padding is a flexible polyurethane padding, and
   (c) the cover is a vinyl cover.

* * * * *